Patented Oct. 15, 1940

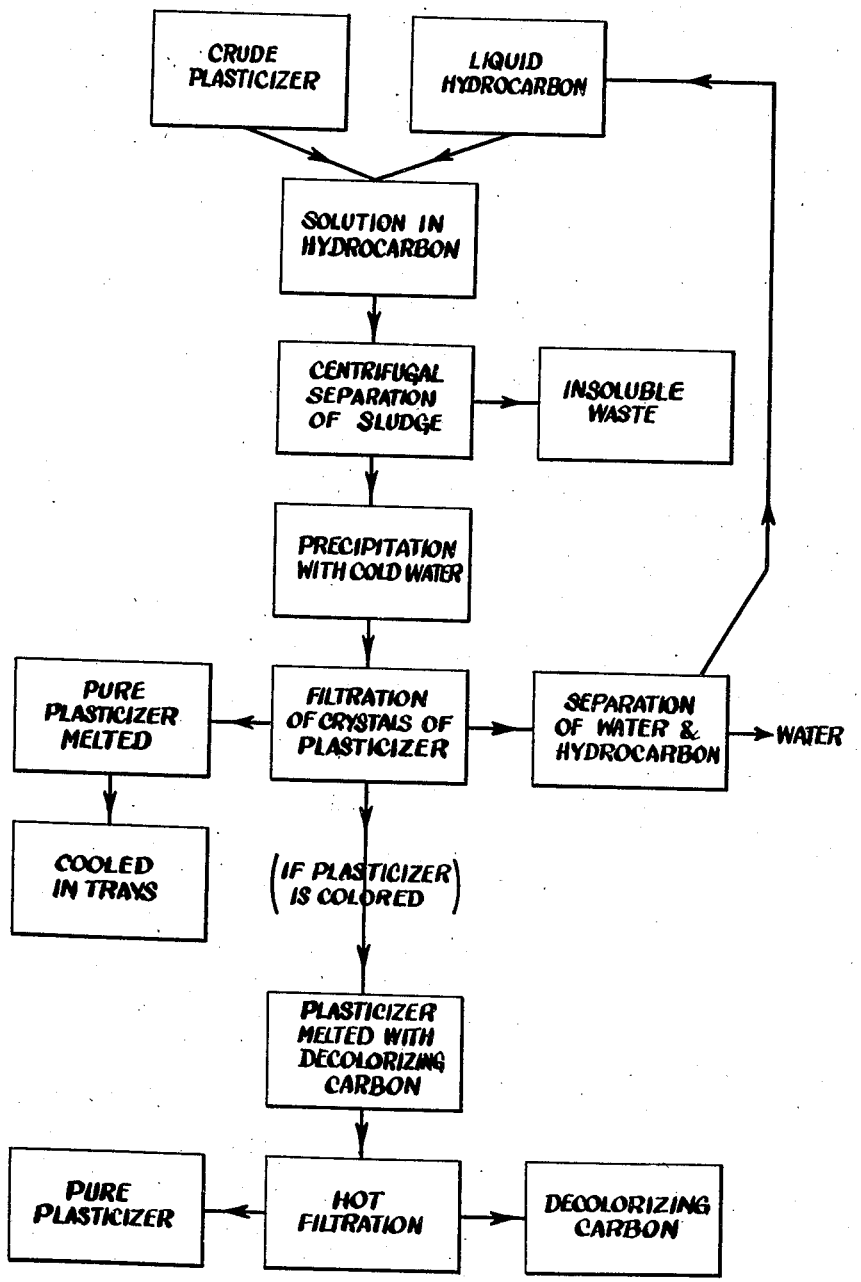

2,217,706

UNITED STATES PATENT OFFICE 2,217,706

PURIFYING OF CRUDE PLASTICIZERS

Marvin J. Reid, Rochester, N. Y., assignor to Eastman Kodak Company, Rochester, N. Y., a corporation of New Jersey Application September 10, 1937, Serial No. 163,274

14 Claims. (Cl. 260—461)

This invention relates to the refining of cellulose acetate plasticizers, such as have been recovered from photographic film scrap or like plastic materials, by dissolving the crude plasticizer in a liquid hydrocarbon and precipitating it from the solvent with cold water.

In the working up of scrap cellulose ester material, particularly photographic film scrap, the cellulose ester base is isolated by leaching the film scrap with a leaching solvent, particularly after the gelatin layer has been removed from the scrap. The gelatin layer is principally removed by means of hot water and the leaching solvent dissolves the plasticizer and subbing layers which have been used, and removes any loosened material, such as residual gelatin, which has not been removed by the hot water treatment. It is then desirable to recover the plasticizer from its solution in the leaching solvent whereby it is obtained in a crude form. An example of a leaching solvent, which may be employed, is a mixture of acetone and methyl alcohol, the former making up 5–30% and the latter 95–70% of the mixture.

The crude plasticizer may be obtained from its solution in the leaching solvent by distillation which separates the leaching solvent therefrom. This process of obtaining the crude plasticizer from the leaching solvent is described and claimed in Fisher and Bright application Serial No. 177,550, filed December 1, 1937. The crude plasticizer at this stage is in a molten condition and generally is wet, due to the use of steam in distilling off the leaching solvent. It is to the recovery of fairly pure plasticizer from this crude residue, whether wet and molten or whether it has been allowed to cool and solidify, that my invention is directed. The crude plasticizer may even be in a dry condition, such as due to its storage for a period of time.

One object of my invention is to provide a process of recovering pure plasticizer in which the liquid used in its refining is removed therefrom. Another object of my invention is to provide a process of refining crude plasticizer in which the fire hazard may be reduced to a minimum. Another object of my invention is to provide a process in which substantially all of the plasticizer is separated from the refining liquid before it is returned for reuse in the refining of further batches of crude plasticizer. Other objects of my invention will appear herein.

I have found that, if the crude plasticizer is dissolved in a liquid hydrocarbon, preferably at an elevated temperature, filtered, such as by centrifuging to remove the insoluble materials therefrom and then poured into cold water, about 50–85% or more of the plasticizer is separated from the refining solvent which is used. I have found that, if this plasticizer is then melted, substantially all traces of the refining solvent is removed and the plasticizer may be obtained in a quite pure condition.

The following examples illustrate processes embodying my invention:

Example I

The crude triphenyl phosphate from a still residue, after the leaching solvent from the extraction of cellulose acetate photographic film scrap has been distilled off, was mixed with textile spirits at a temperature of about 80° F. so that the triphenyl phosphate dissolved therein. The solution was then centrifuged to remove any insoluble materials, such as gelatin, nitrocellulose, or subbing material, which might be present. The clear solution, while still at the elevated temperature, was run into cold water, having a temperature of approximately 40° C. The triphenyl phosphate separated forming a thin mushy mass from which it was removed by filtration. The triphenyl phosphate was then melted at a temperature which drove off any water and hydrocarbon which might be present. In the case of textile spirits the melting temperature of the triphenyl phosphate is sufficient. It was run into pans where it was allowed to solidify. The filtrate of hydrocarbon and water formed into two layers and were separated. The water was discarded while the textile spirits were returned to the system to refine a further batch of crude plasticizer.

Example II 350 pounds of crude triphenyl phosphate are dissolved in a suitably agitated tank containing 1000 gallons of Stoddard solvent at a temperature of about 140° F. After stirring about one hour at this temperature, solution of the triphenyl phosphate is complete. The hot solution is passed through a centrifuge operating at about 13,000 times the force of gravity. The solution is fed through at a rate of about 200 gallons per hour. The liquid issuing from the centrifuge passes directly to an agitated precipitating or crystallizing tank containing sufficient cold water to lower the resultant mixture to 65° C. In this case, approximately 5000 gallons of water at 50° F. are required. In an alternative procedure, the hot solution of triphenyl phosphate may be allowed to settle for three or four hours and the supernatant liquid carefully decanted through a filter into the crystallizing tank.

The mass of crystals thus obtained is filtered in a filter press at a pressure of about 125 pounds per square inch. The cake is removed and melted in a closed container connected with the condensers to collect solvent. The molten material is poured into trays and allowed to cool.

300 pounds of triphenyl phosphate are obtained having a melting point of 48 to 50° F. The color is satisfactory for further use.

The mixture of solvent and water left after filtration is separated, the water is discarded and the solvent containing less than 50 pounds of triphenyl phosphate is passed into a suitable storage tank from which it may be withdrawn without further treatment for re-use in the crystallizing process.

*Example III*

800 pounds of crude triphenyl phosphate are dissolved in textile spirits at a temperature of 85° F. just as described in Example II. After solution, the mixture is cooled to 60° F., centrifuged and the clear liquid containing the triphenyl phosphate is passed into 1000 gallons of water at 40° F. 400 pounds of triphenyl phosphate are obtained after filtration, melting and cooling as described in Example II. The textile spirits containing less than 400 pounds of triphenyl phosphate are passed into a storage tank and held without further treatment for re-use in the crystallizing cycle.

If the triphenyl phosphate after crystallization, contains color such as would prevent its use, it is de-colorized in the following manner: 400 pounds of molten triphenyl phosphate at about 130° F. are mixed with 4 pounds of activated wood char and 3 pounds of a filter aid such as infusorial earth. The hot mix is filtered through a filter press previously coated with the filter aid. The molten filtrate is flowed into shallow trays and allowed to cool. This treatment effectually removes any color contamination not capable of separation by the hot centrifugal treatment.

If the plasticizer is found to be colored after purifying it, it is preferable to add decolorizing carbon, such as activated wood charcoal, to the melted material whereupon it is subjected to a filtration while in the heated condition. The melted triphenyl phosphate is thereby recovered without the accompanying color and may be allowed to cool to solidify.

The accompanying flow sheet illustrates the principal steps in the recovery of a typical solid plasticizer for cellulose acetate in accordance with my invention.

Various liquid hydrocarbons, such as textile spirits, ligroin, Stoddard solvent, cyclohexane, kerosene, benzene or toluene may be employed in my process. Due to the limitations present with some types of hydrocarbons, it is preferred that an aliphatic hydrocarbon be employed. For instance, where the crude plasticizer was obtained from film scrap in which a polyvinyl ester resin or acrylic acid resin was present, it would not be desirable to use benzene or toluene, due to the solubility of those resins in aromatic hydrocarbons. Therefore, the aliphatic hydrocarbons, particularly the petroleum distillates, are preferred, as there are few, if any, limitations to the extent of their use. It is desirable that the liquid hydrocarbon, which is used as the refining solvent, be one in which at least a major portion thereof boils off at a temperature not to exceed 220° C. The maximum boiling point of the solvent is governed by the fact that it should be driven off from the plasticizer in the final melting operation. If the hydrocarbon boils at a temperature so high that in its removal the plasticizer will be decomposed, such a hydrocarbon is obviously not the most desirable for use in refining the plasticizer. It is preferred to use the higher boiling hydrocarbons, due to the less solvent loss which may occur and their less dangerous nature. For instance, with the lower boiling hydrocarbons, there is a tendency to form explosive mixtures with air which is not present with the higher boiling hydrocarbons, such as Stoddard solvent.

For the use of textile spirits, which have a boiling range of about 70–105° C., a temperature range, for dissolving the plasticizer, of 80–60° F. is satisfactory. With the higher boiling hydrocarbons, such as Stoddard solvent, a higher temperature can be employed. The principal reason why the temperature is kept low in the dissolving step is to prevent the loss of the solvent. If the procedure were carried out in an enclosed system where the loss of solvent is only a minor factor, it is possible to go near the initial boiling point of the liquid hydrocarbon. By this means a greater differential is obtained between the temperature of the solvent and the temperature of the cold water into which the solution is precipitated, which allows the refining of greater amounts of the plasticizer. Although the temperature differential may be increased by cooling of the precipitating water, nevertheless, this cooling is limited by the freezing point of the water and by the cost of cooling down to lower temperatures.

Some of the plasticizers which may be purified by my invention are: triphenyl phosphate, tricresyl phosphate, diethyl phthalate, ethyl acetanilide, mono chlornaphthalene, ortho-cresyl para-toluene sulfonate and butyl sulfone. In the dissolving step, some of the impurities, which may be removed from the crude plasticizer, are nitrocellulose, gelatin, which was not removed in the water washing, resins, such as the polyvinyl ester resins, the polyvinyl acetals, the acrylic acid resins or any other resins which might be found suitable for use in the making of photographic film, for instance for the subbing layer. Other plastic materials which are not soluble in the leaching solvent might also be removed upon centrifuging the hydrocarbon solution of the plasticizer. For instance, a coating of a far-hydrolyzed cellulose acetate, such as described in Fordyce application Serial No. 62,333, might be a constituent of photographic film and would be separated from the plasticizer which was being refined.

After the plasticizer has been dissolved in the hydrocarbon liquid, it is usually desired that the material be filtered, thus removing any of the subbing materials which might be present in suspension in the hydrocarbon solution.

By my invention I obtain substantially complete recovery of a substantially pure plasticizer from the crude plasticizer. As thus recovered, it is suitable for direct use in subsequent batches of cellulose acetate such as for use in the making of photographic film. The crude plasticizer from the refining of other scrap esters, such as those in which cellulose acetate butyrate or cellulose acetate propionate, have been used as the film base, is also within the scope of my invention.

The final melting step serves two purposes, first, the removal of the hydrocarbon and water from the plasticizer and second the forming of an easily handled unit therefrom. If a higher boiling hydrocarbon has been used, it would be desirable to heat the melted plasticizer to a temperature which will drive off the liquid hydrocarbon but which will not decompose the plasticizer. Thereby even with the use of a high boiling hydrocarbon, the plasticizer is recovered with all trace of the hydrocarbon absent.

The term "textile spirits" refers to a refined petroleum distillate having a boiling range of 70–105° C. "Stoddard solvent" is a term used to identify a certain type of liquid petroleum distillate which is described in Bureau of Standards Bulletin CS3–28. The term "sub" or "subbing layer" is used herein to refer to an extremely thin layer which is deposited on the surface of a cellulose derivative film support, usually to serve as an undercoat for the application of a layer of photographic emulsion or other material. This term is defined in U. S. Patent No. 2,066,850 of Nadeau and is referred to in other patents, such as U. S. 2,096,617 of Nadeau and No. 2,059,862 of Gray.

I claim:

1. The process of purifying a crude solid cellulose acetate plasticizer derived from the extraction of a cellulose ester composition containing it, the extractant having been removed which comprises dissolving the crude material in a liquid hydrocarbon, the major portion of which boils at a temperature not to exceed 220° C., removing the insoluble material therefrom, throwing the plasticizer out of solution by mixing with a precipitating amount of cold water, separating the plasticizer from the water-hydrocarbon and heating the plasticizer to a melting temperature which will drive off the hydrocarbon without decomposing the plasticizer.

2. The process of purifying a crude solid cellulose acetate plasticizer derived from the extraction of a cellulose ester composition containing it, the extractant having been removed which comprises dissolving the crude material in a liquid aliphatic hydrocarbon, the major portion of which boils at a temperature not to exceed 220° C., removing the insoluble material therefrom, throwing the plasticizer out of solution by mixing with a precipitating amount of cold water, separating the plasticizer from the water-hydrocarbon and heating the plasticizer to a melting temperature which will drive off the aliphatic hydrocarbon without decomposing the plasticizer.

3. The process of purifying crude triphenyl phosphate derived from the extraction of a cellulose ester composition containing it, the extractant having been removed which comprises dissolving the crude material in a liquid hydrocarbon, the major portion of which boils at a temperature not to exceed 220° C., removing the insoluble material therefrom, throwing the triphenyl phosphate out of solution by mixing with a precipitating amount of cold water, separating the triphenyl phosphate from the water-hydrocarbon and heating it to a melting temperature which will drive off the hydrocarbon without decomposing the plasticizer.

4. The process of purifying a crude solid cellulose acetate plasticizer derived from the extraction of a cellulose ester composition containing it, the extractant having been removed which comprises dissolving the crude material in a liquid petroleum distillate, the major portion of which boils at a temperature not to exceed 220° C., removing the insoluble material therefrom, throwing the plasticizer out of solution by mixing with a precipitating amount of cold water, separating the plasticizer from the water-petroleum distillate and heating the plasticizer to a melting temperature which will drive off the distillate without decomposing the plasticizer.

5. The process of purifying a crude solid cellulose acetate plasticizer derived from the extraction of a cellulose ester composition containing it, the extractant having been removed which comprises dissolving the crude material in an aliphatic-hydrocarbon boiling within the range of 140–220° C., removing the insoluble material therefrom, throwing the plasticizer out of solution by mixing with a precipitating amount of cold water, separating the plasticizer from the aliphatic-hydrocarbon and heating the plasticizer to a melting temperature which will drive off the hydrocarbon without decomposing the plasticizer.

6. The process of purifying a crude solid cellulose acetate plasticizer derived from the leaching of a cellulose acetate composition containing it which remains as a still residue after separating it from the leaching solvent which comprises dissolving the crude material in a liquid hydrocarbon, the major portion of which boils at temperature not to exceed 220° C., removing the insoluble material therefrom, throwing the plasticizer out of solution by mixing with a precipitating amount of cold water, separating the plasticizer from the water-hydrocarbon and heating the plasticizer to a melting temperature which will drive off the hydrocarbon without decomposing the plasticizer.

7. The process of purifying a crude, colored solid cellulose acetate plasticizer derived from the extraction of a cellulose acetate composition containing it, the extractant having been removed which comprise dissolving the crude material in a liquid hydrocarbon, the major portion of which boils at a temperature not to exceed 220° C., removing the insoluble material therefrom, throwing the plasticizer out of solution by mixing with a precipitating amount of cold water, separating the plasticizer from the water-hydrocarbon, melting the plasticizer and incorporating decolorizing carbon therein and then filtering off the carbon while the plasticizer is in a liquid condition.

8. The process of purifying a crude solid cellulose acetate plasticizer derived from the extraction of a cellulose ester composition containing it, the extractant having been removed which comprises dissolving the crude material in a liquid hydrocarbon, the major portion of which boils at a temperature not to exceed 220° C., removing the insoluble material therefrom, throwing the plasticizer out of solution by mixing with a precipitating amount of water at a temperature of approximately 40° F., separating the plasticizer from the water-hydrocarbon and heating the plasticizer to a melting temperature which will drive off the hydrocarbon without decomposing the plasticizer.

9. The process of purifying a crude solid cellulose acetate plasticizer derived from the extraction of a cellulose ester composition containing it, the extractant having been removed which comprises dissolving the crude material in a liquid hydrocarbon, the major portion of which boils at a temperature not to exceed 220° C., removing the insoluble material therefrom, throwing the plasticizer out of solution by mixing with a precipitating amount of cold water, separating the plasticizer from the water-hydrocarbon and heating the plasticizer to a melting temperature which will drive off the hydrocarbon without decomposing the plasticizer.

10. The process of purifying a crude solid cellulose acetate plasticizer derived from the extraction of a cellulose ester composition containing it, the extractant having been removed which comprises dissolving the crude material in a liquid hydrocarbon, the major portion of which boils at a temperature not to exceed 220° C., centrifuging the mass to remove the insoluble material from the solution, throwing the plasticizer out of solution by mixing with a precipitating amount of cold water, separating the plasticizer from the water-hydrocarbon and heating the plasticizer to a melting temperature which will drive off the hydrocarbon without decomposing the plasticizer.

11. The process of purifying a crude solid cellulose acetate plasticizer derived from the extraction of a cellulose ester composition containing it, the extractant having been removed which comprises dissolving the crude material in a liquid hydrocarbon at a temperature near the initial boiling point of the hydrocarbon and removing the insoluble material therefrom, both steps being performed in an enclosed system, and then throwing the plasticizer out of solution by mixing it with a precipitating amount of cold water, separating the plasticizer from the water-hydrocarbon and heating the plasticizer to a melting temperature which will drive off the hydrocarbon without decomposing the plasticizer.

12. A process of purifying crude triphenyl phosphate derived from the extraction of a cellulose ester composition containing it, the extractant having been removed which comprises dissolving the crude material in a low boiling petroleum distillate, centrifuging the solution to remove the insoluble material therefrom, throwing the plasticizer out of solution by mixing with a precipitating amount of cold water, separating the triphenyl phosphate from the water-petroleum distillate and then heating it to a temperature of approximately 50° C. to drive off the petroleum distillate therefrom.

13. The process of purifying crude triphenyl phosphate derived from the extraction of a cellulose ester composition containing it, the extractant having been removed which comprises dissolving it in Stoddard solvent at a temperature of 100–140° C., centrifuging the solution to remove the insoluble material therefrom, mixing the solution with a precipitating amount of cold water, separating the triphenyl phosphate from the water-Stoddard solvent and then heating the triphenyl phosphate to a temperature sufficient to drive off the Stoddard solvent without decomposing the triphenyl phosphate.

14. A cyclic process for purifying a crude cellulose acetate plasticizer derived from the extraction of a cellulose acetate composition containing it, the extractant having been removed, which is solid at ordinary temperatures which comprises dissolving the crude material in a liquid hydrocarbon, the major portion of which boils at a temperature not to exceed 220° C., removing the insoluble material therefrom, throwing the plasticizer out of solution by mixing with a precipitating amount of cold water, separating the plasticizer from the water-hydrocarbon, separating the hydrocarbon from the water, dissolving a second batch of crude plasticizer in liquid hydrocarbon composed principally of that used previously and removing the insoluble material and recovering the plasticizer therefrom as before.

MARVIN J. REID.